(12) United States Patent
Tyni et al.

(10) Patent No.: US 6,935,467 B1
(45) Date of Patent: Aug. 30, 2005

(54) METHOD FOR CONTROLLING AN ELEVATOR GROUP

(75) Inventors: Tapio Tyni, Hyvinkää (FI); Jari Ylinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 192 days.

(21) Appl. No.: 10/645,596

(22) Filed: Aug. 22, 2003

Related U.S. Application Data

(63) Continuation of application No. PCT/FI02/00135, filed on Feb. 19, 2002.

(30) Foreign Application Priority Data

Feb. 23, 2001 (FI) .............................................. 20010355

(51) Int. Cl.⁷ ................................................. B66B 1/18
(52) U.S. Cl. ....................................... 187/382; 187/247
(58) Field of Search ................................. 187/247, 248, 187/380, 382, 902, 910; 706/13, 21, 902, 903, 910

(56) References Cited

U.S. PATENT DOCUMENTS

| | | | |
|---|---|---|---|
| 4,448,286 A | 5/1984 | Kazunuki et al. | |
| 5,612,519 A | 3/1997 | Chenais | |

FOREIGN PATENT DOCUMENTS

| | | |
|---|---|---|
| EP | 2111244 A | 6/1983 |
| EP | 0 342 008 A2 | 11/1989 |
| JP | 54-80949 A | 6/1979 |

Primary Examiner—Jonathan Salata
(74) Attorney, Agent, or Firm—Birch, Stewart, Kolasch & Birch, LLP

(57) ABSTRACT

Elevator group control method for the allocation of landing calls, in which method a target value is assigned to a given service time of the elevator group and landing calls are so allocated to elevators that the assigned target value of the service time is realized on the average, the energy consumption of the elevator group being thereby reduced.

6 Claims, 3 Drawing Sheets

METHOD FOR CONTROLLING AN ELEVATOR GROUP

Figure 1A:
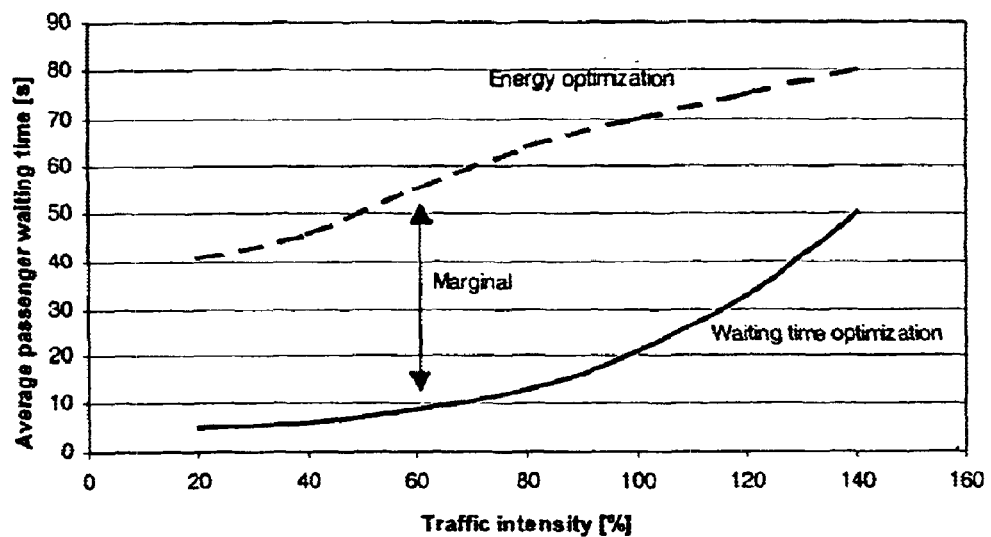

This nonprovisional application is a Continuation application and claims priority under 37 C.F.R. § 1.53(b) of PCT International Application No PCT/FI02/00135 filed on Feb. 19, 2002 and claims priority under 35 U.S.C. § 119(a) on Patent Application No(s). 20010355 filed in Finland on Feb. 23, 2001, all of which are herein incorporated by reference.

The present invention relates to an elevator group control method for the allocation of landing calls to elevator cars in a manner aiming to provide a set passenger service level.

Among the many different tasks of an elevator control system, its basic function is allocation of landing calls. The aim in call allocation is to assign the calls to elevator cars in a manner that will optimize a characteristic descriptive of the system. Traditionally, the most commonly used characteristics are associated with call times and passenger waiting times. In typical solutions, averages and distributions are calculated from these characteristics.

There are various methods for the allocation of landing calls, and each elevator company has its own methods for implementing this task. However, a feature common to all these different methods is that they include a number of parameters that are characteristic of each method, these parameters being used to influence the operation of the method employed. It is possible to use an arrangement whereby in different traffic situations a parameter set appropriate for the situation is applied. The objective here is to enable the system to adapt to the prevailing traffic situation in the building.

In a prior-art control system, a traffic detector monitors the operation and state of the elevator system and determines the prevailing traffic type and intensity. The things to be monitored are typically landing calls, car calls, elevator loads etc. Depending on the traffic type detected; a parameter set tailored for this traffic type is applied. For example, a parameter set used during outward peak traffic may give a higher weighting to landing calls for a traveling direction towards entrance floors than to calls issued from entrance floors. In peak hours, more weight may be given to the travel time of the passenger in the elevator car. When the aim is to minimize two or more quantities at the same time, the procedure adopted is called multi-goal optimization.

A problem in the above-described method is the difficulty of defining the practical values of the parameter set corresponding to each traffic situation, said parameter sets being stored in a parameter bank. These parameters are sensitive to factors like building type, number of floors, distribution of passengers between different floors in the building, number of elevators in an elevator group and properties of the elevators. Moreover, the actual traffic in the building is changeable, the population distribution is not stationary in the long term, and the operation of traffic detectors is susceptible to inaccuracy, detection errors and detection delays.

In practice, the parameter sets in the parameter bank have to be assigned compromised values that function reasonably in most deliveries without individual settings. These parameter values can be set e.g. on the basis of simulation operation or on the basis of expert experience. It is obvious that average parameter values like these will not result in optimal operation in the case of each building and elevator group.

Another problem with changing the parameter set on the basis of traffic type is the selection of the quantities to be weighted and the evaluation of the weightings. Numerous quantities to be optimized can be found, such as call time, estimated passenger waiting time, riding time travel time, number of stops, car load, number of simultaneous car and landing calls, and so on. Which ones of these quantities should be weighted and how much in each traffic situation? If the quantities and weightings are selected and fixed beforehand, then this is an advance selection made by the designer, which is not necessarily in keeping with the needs of the owner of the building. On the other hand, if the quantities to be optimized are not to be fixed beforehand, a possible approach is to allow some freedom to the operating personnel of the building and let them decide themselves about the weightings in different traffic situations. However, due to the adjustments and the complexity of the matter as a whole, this is not a reasonable alternative.

The object of the present invention is to eliminate some of the above-mentioned drawbacks. A specific object of the invention is to disclose a new type of method for controlling an elevator group in which it is possible to optimize two goals contrary to each other and obtain an optimal result on the whole, depending in each case on how these contrary goals are weighted in relation to each other.

As for the features characteristic of the invention, reference is made to the claims.

In the elevator group control method of the invention, to allocate landing calls, a target value is assigned to a given service time of the elevator group. Landing calls are then so allocated that the assigned target value of service time is achieved on the average, the energy consumption of the elevator group being thus reduced. The quantity used as service time may be e.g. the call time, passenger waiting time, travel time or riding time.

In other words, in the method of the invention, two non-commensurable quantities contrary to each other, i.e. time and energy consumption, are optimized. In the method of the invention, in order to render these quantities commensurable and mutually comparable, the routes R of the elevators are preferably so chosen that the cost term $$J = W_T \cdot T_N(R) + W_E \cdot E_N(R) \quad (1)$$

is minimized. $T_N(R)$ is a normalized sum of call times for route alternative R, and correspondingly $E_N(R)$ is a normalized energy consumption associated with route alternative R. $W_T$ ja $W_E$ are weighting coefficients of the above-mentioned cost term, so that $$0 \leq W_T \leq 1 \text{ ja } W_E = 1 - W_T. \quad (2)$$

The individual waiting times are exponentially distributed, but their sum T(R) approximately follows the normal distribution, which means that they permit the application of normalization $T_N(R) = (T(R) - \mu_T)/\sigma_T$. Similarly for the energy term $E_N(R) = (E(R) - \mu_E)/\sigma_E$. The expectation values $\mu$ and average distributions $\sigma$ are the characteristic numbers of the entire set of targets, i.e. of the route alternatives applicable in the current call situation in practice, because the number of route alternatives grows exponentially with the number of active landing calls, it is necessary to make do with sample quantities: instead of an expectation value, sample averages $\overline{T}$ and $\overline{E}$ are used, and instead of a standard deviation, sample standard deviations $S_T$ and $S_E$ are used. This yields $T_N(R) \approx (T(R) - \overline{T}(R))/S_T(R)$ and $E_N(R) \approx (E(R) - \overline{E}(R))/S_E(R)$, where R is a number of stochastically generated route alternatives that is sufficient to produce reliable estimators for $\mu$ and $\sigma$. After normalization, both optimization goals show approximately the distribution N(0,1), and thus they can be summed without problems.

Figure 1B:
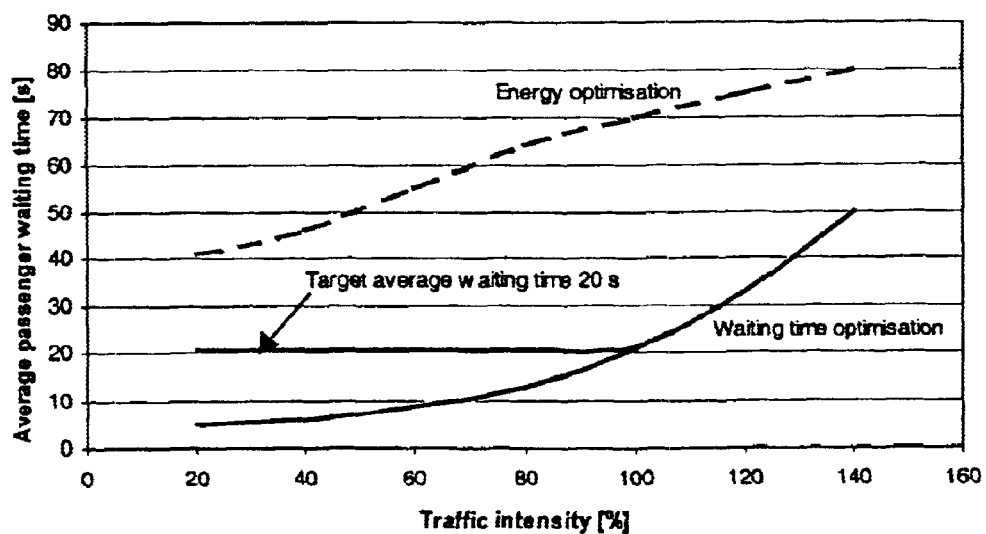

When landing calls are allocated in this way, two extreme points can be observed in the operation of the system, i.e. a situation where $W_T=1$ and $W_E=0$, and a situation where $W_T=0$ and $W_E=1$. In the first situation, the optimization process finds elevator routes such that the total waiting time for the calls is as short as possible. In the second situation, the optimization process devises the routes so as to minimize the energy consumption of the elevators. FIG. 1 illustrates these situations.

In FIG. 1, the horizontal axis represents relative traffic intensity in comparison with the theoretical transportation capacity of the elevator group. The traffic type is purely outgoing traffic. It can be seen from the curves that waiting time optimization and energy consumption optimization are goals contrary to each other: when only one of the goals is optimized, the other goal suffers. For different traffic types, the forms and absolute values of the curves differ from each other, but the basic nature of the operation remains the same.

FIG. 1 illustrates the two extremities in the operation of the system. It is obvious that is possible to move steplessly between these extremities by selecting weighting coefficients $W_T$ and $W_E$ in accordance with formula 2. The available operating range is limited to the area between the two curves, in respect of both waiting times and energy consumption. As an example, the operating range available at the point of 60% intensity is indicated by arrows in FIG. 1. In principle, it is possible to draw for any arbitrarily chosen traffic type and intensity a separate characteristic curve describing a stepless transition of the system from pure energy optimization to pure waiting time optimization.

Although there are now only two quantities to be optimized and it is possible to move steplessly from pure waiting time optimization to pure energy consumption optimization by altering the respective weighting coefficients, there remains the difficult question of how to determine the weighting coefficients $W_T$ and $W_E$. On what grounds should the weighting coefficients for a given detected traffic type be set so as to suit this particular building?

The problem with arbitrarily set weighting coefficients is that there is no higher-level goal that should be aimed at; instead, there are only a number of more or less detached quantities to be optimized. In the method of the invention, the starting point is to aim at allocating landing calls in such manner that a given average passenger service time, such as e.g. waiting time, remains at a certain level regardless of the traffic situation and intensity. Included in FIG. 1 are curves describing a situation where the average passenger waiting time is defined as 20 seconds.

By choosing coefficients $W_T$ and $W_E$ that are suited to the prevailing traffic situation, it is possible to reach a set goal regarding waiting time and at the same time to save energy needed for the transportation of passengers. Both curves in FIG. 1 show clearly that the target time can be maintained up to an almost 100% traffic intensity while the energy required for passenger transportation is reduced. This reduction is significant at traffic intensity levels below 60%. As the traffic intensity increases, eventually a point is reached where the set goal cannot be reached even via pure waiting time optimization.

We have thus found a connecting principle whereby the more or less detached quantities to be optimized can be harnessed to reach a higher-level goal, i.e. average waiting time. However, there still remains the problem of how to determine the practical values of $W_T$ and $W_E$ in different traffic situations.

In the method of the invention, preferably the detection of traffic and the parameter sets associated with it are effectively eliminated by means known in control engineering. In control engineering, the aim is to control a process so that the controlled quantity remains at its target value as closely as possible. The idea is to compare the controlled quantity to a set value and to form from the error between these a control signal by means of which the operation of the system can be directed appropriately so that the error between the set value and the controlled quantity is eliminated.

Figure 2:
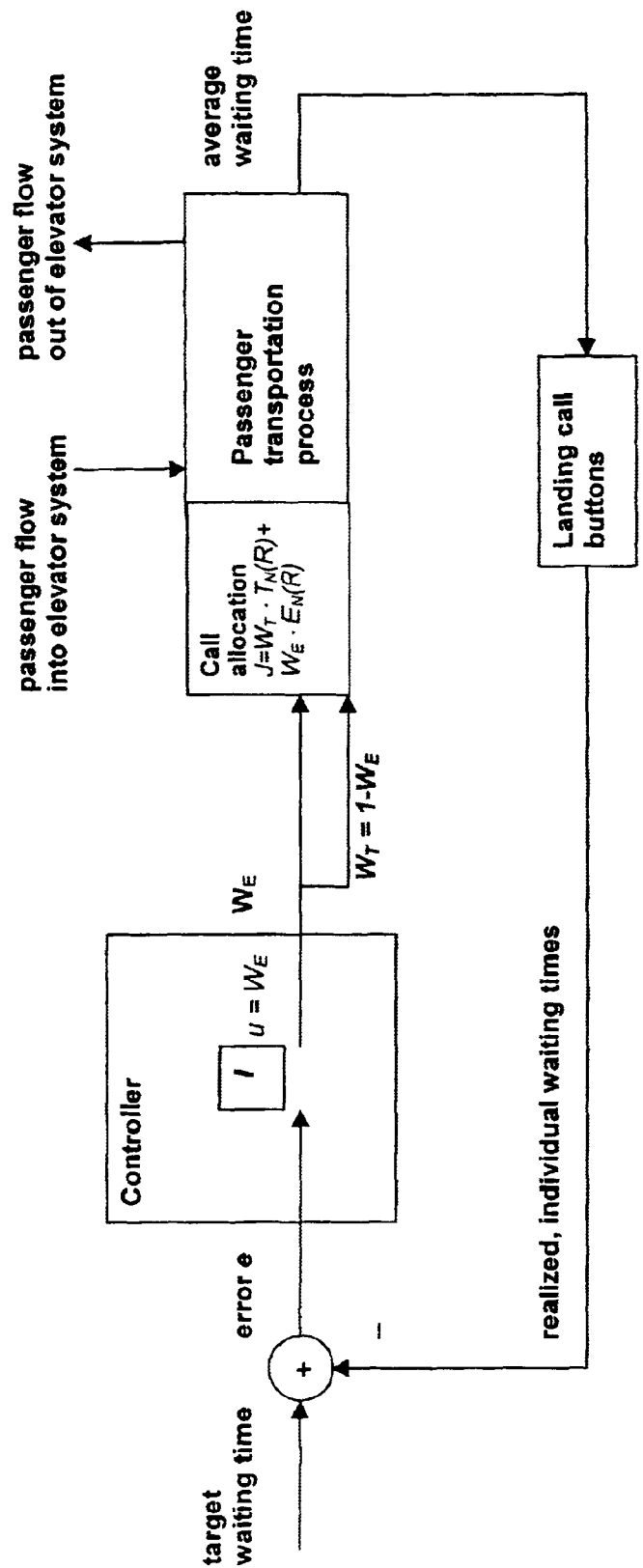

FIG. 2 illustrates a controlled process adapted to the allocation of landing calls in an elevator group whereby, according to the invention, separate traffic detection is eliminated and the system is rendered immune to both changes in the process itself and to external factors. This naturally applies only within the limits in which the process is able to reach the set goal.

In the passenger transportation process, the quantity to be controlled is preferably the average waiting time of passengers traveling in the system. Measurements of this quantity are obtained via the landing call buttons. A call is activated when a passenger having entered the system issues a call, and it is deactivated when the elevator to which it has been allocated starts decelerating to stop at the destination floor, thereby resetting the call. The individual waiting times thus realized are compared to a set target time.

Since this measurement contains a lot of noise, in other words, the realized individual call times vary from zero to values as high as over 90 seconds, of the three possible PID controller blocks only the integrating block is used. The integrating block drives the average error to zero. In the method of the invention, it is necessary to select an integration time constant long enough to ensure that an individual noisy measurement cannot have too strong an effect on the control signal u but still short enough to ensure that the system will react to changes occurring in the traffic type and intensity.

The control signal u obtained from the integrating controller is converted into a waiting time optimization coefficient $W_T$ in accordance with formula 2. The integral of the error e drives the process along its characteristic curve to a point at which the error e becomes zero. For example, if the average of realized call times tends to lag behind the target, which means that the system serves too well e.g. in consequence of a low traffic intensity, then the error e grows in the positive direction. As a result of this, weighting coefficient $W_T$ increases while $W_E$ decreases, so the characteristic curve for waiting time develops towards longer waiting times, in other words, the importance of energy consumption in the selection of route alternatives is increasing while the importance of waiting times is decreasing.

Figure 3A:
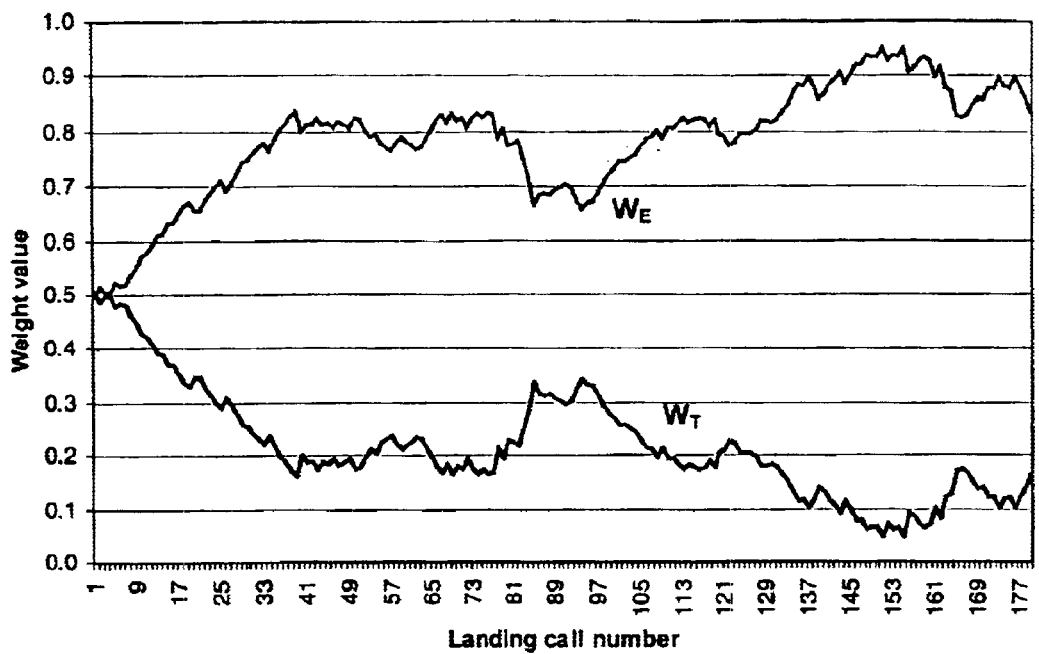
Figure 3B:
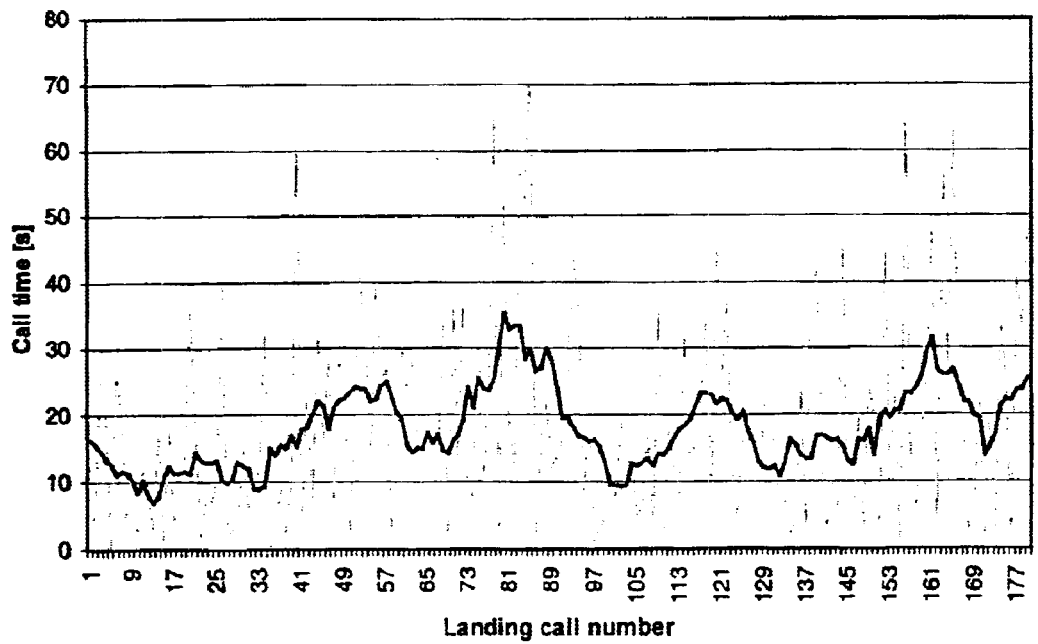

FIG. 3 shows how the weighting coefficients automatically assume values at which the long-term average of actual waiting times corresponds to the target value. In FIG. 3, the weighting coefficients assume a value in the right range during the first 40 calls. After this, the controller is able to keep the long-term average of waiting times relatively accurately at the target value. Examining the calls no. 40–180 served after this stabilization point, the average of the respective waiting times is found to be 20. By contrast, since the waiting time measurement is very noisy, short-term local traffic variations cannot be avoided. This is not the final aim, either, but the aim is to bring the long-term average of the service to the set level, and this aim is thus clearly realized.

By using the method of the invention for controlling an elevator group, it is possible to achieve an energy saving of 30–40% when the controlled target time is 20 seconds. Thus, the elevator group control method of the invention brings very significant savings in energy consumption without substantially impairing the service level of the elevator group as a whole.

The unexpectedly large energy saving achieved by the method of the invention is based on the following facts discovered in the invention. An elevator group is designed to answer to the transportation needs in peak traffic conditions in the building and to provide an acceptable service level during hours of peak traffic. In other traffic conditions, traditional elevator group control produces excess capacity in the sense that passengers are still served as efficiently as possible. This leads to very short waiting times and a high energy consumption. If a lower service level requirement is applied during hours of lighter traffic, i.e. if services are not always provided as quickly as possible, this excess capacity can be converted into a saving in energy consumption.

The ultimate reason for the energy saving achieved by the method of the invention is the unsymmetrical nature of elevator movements. The elevator is designed in such a way that the car and counterweight are in balance when the car is carrying a half-load. In practical passenger traffic, the car load only seldom has a weight that balances the elevator, i.e. generally the elevator is lighter to move in one direction than in the other direction, in other words, moving the elevator in one direction requires less energy than moving it in the other direction.

During light traffic periods, the car generally moves with a very small load, in other words, the car and counterweight are far from a balanced state. Now that the method of the invention provides relief of the requirement that the passenger should always be picked up as quickly as possible, the routes of the elevators in the building can be so designed and arranged that the elevators are moved by routes as advantageous as possible in respect of energy consumption, yet with an aim to achieve the set target time.

By the method of the invention, the entire elevator group can be brought under complete control. By the method of the invention, it is possible to specify a service level that the elevator system will produce for passengers regardless of the traffic situation and to convert the excess capacity of the elevator group and its control system into an energy saving during periods of lighter traffic. By control engineering means, the method can be implemented as a closed loop that eliminates the effects of both internal and external factors and stabilizes the service level of the system. Thus, in the method of the invention, the service level can be defined simply by defining a desired average service time, such as waiting time.

As the target to be set in the method of the invention is of a sufficiently general nature and is reasonable and easy to understand, it is possible to make a simple user interface for it and even to allow the target waiting time to be set by the personnel of the building. For the target time, it is also possible to prepare a user-programmable calendar, allowing different service levels to be set for different days of the week and times of the day.

What is claimed is:

1. Elevator group control method for the allocation of landing calls, characterized in that a target value is assigned to a given service time of the elevator group and landing calls are so allocated to elevators that the assigned target value of the service time is realized on the average, the energy consumption of the elevator group being thereby reduced.

2. Method as defined in claim 1, characterized in that the landing calls are so allocated to elevators that the energy consumption of the traveling routes of the elevators is minimized and a long-term average of the given service time fulfills the target value.

3. Method as defined in claim 1 or 2, characterized in that the service time used is the call time, passenger waiting time, travel time or riding time.

4. Method as defined in claim 1, characterized in that, in the method, the elevator routes are so selected that the cost term $J=W_T \cdot T_N(R)+W_E \cdot E_N(R)$ is minimized, where $T_N(R)$ is a normalized sum of call times for route alternative R, $E_N(R)$ is normalized energy consumption resulting from selecting route alternative R, and $W_T$ and $W_E$ are weighting coefficients of $T_N(R)$ and $E_N(R)$ such that $0 \leq W_T \leq 1$ and $W_E=1-W_T$.

5. Method as defined in claim 4, characterized in that $W_T$ and $W_E$ are determined via integration by a controller in which the actual service time is compared to the target value and the error between these in integrated, the control sign u obtained from the controller is converted into a weighting coefficient for service time optimization $W_T=1-W_E$, when $u=W_E$.

6. Method as defined in claim 1, characterized in that the target value is so defined that it varies on the basis of times of the day, days of the week and/or holiday periods.

* * * * *